(No Model.)
W. N. WHITELEY.
BUNDLE CARRIER FOR HARVESTERS.
No. 322,228. Patented July 14, 1885.
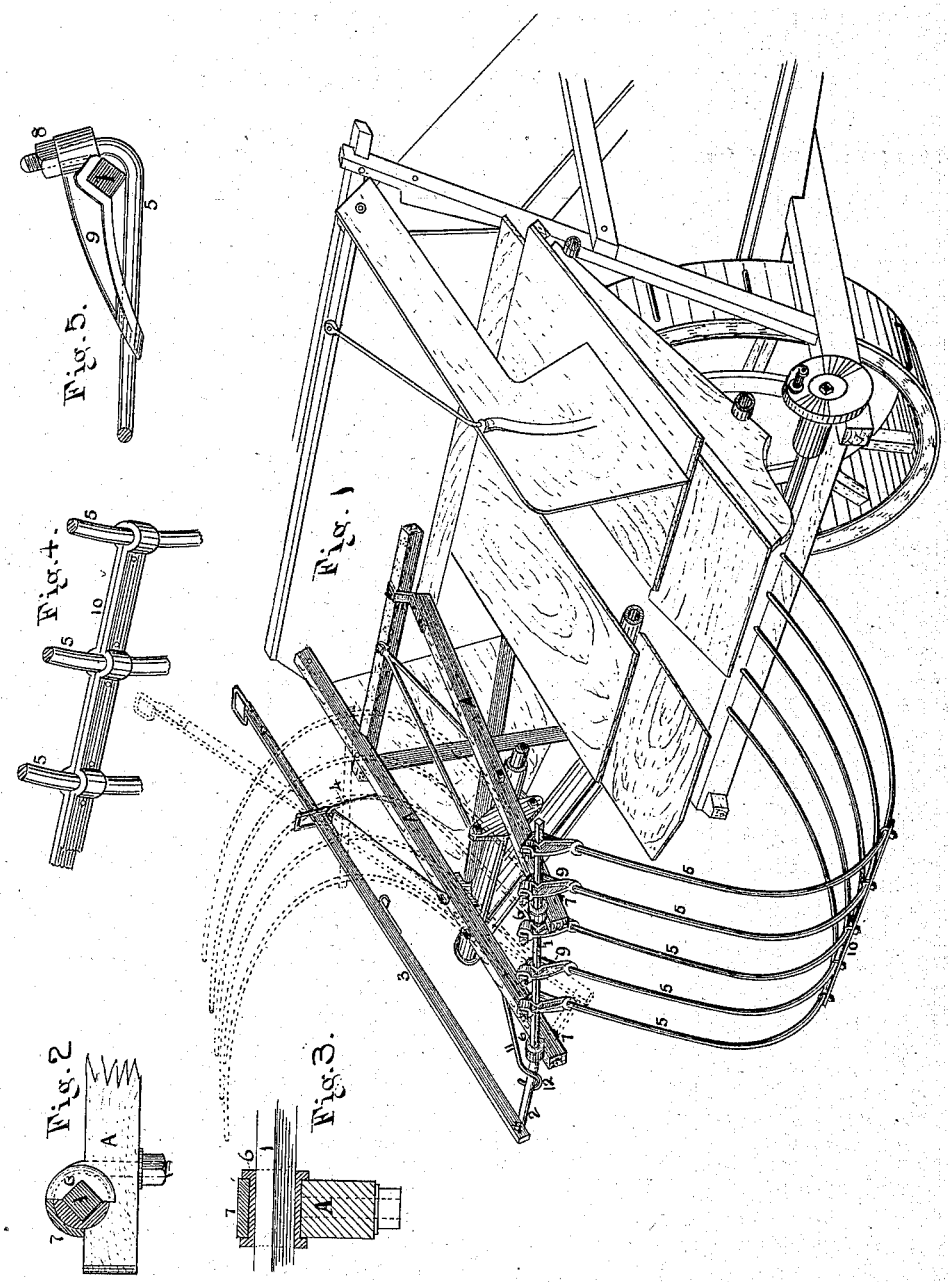
Witnesses:
J. C. Turner
E. C. Ford
Inventor:
William N Whiteley
By his atty
R D Smith

UNITED STATES PATENT OFFICE.

WILLIAM N. WHITELEY, OF SPRINGFIELD, OHIO.

BUNDLE-CARRIER FOR HARVESTERS.

SPECIFICATION forming part of Letters Patent No. 322,228, dated July 14, 1885.

Application filed April 16, 1884. (No model.) Patented in Canada September 26, 1884, No. 20,274.

*To all whom it may concern:*

Be it known that I, WILLIAM N. WHITELEY, of Springfield, in the county of Clark and State of Ohio, have invented new and useful Improvements in Bundle-Carriers for Harvesters; and I do hereby declare that the following is a full and accurate description of the same.

The general features of my bundle-carrier as to its structure and general mode of operation are shown and described in the specification forming a part of my patent granted February 3, 1885, and numbered 311,550, and hereby referred to.

The invention included herein is an improvement upon the bundle-carrier referred to above in certain details of structure—to wit, in the shaft and mode of attaching the depending teeth thereto, and in the crank end, whereby the carrier may be turned over upon its back above the binder for convenience in transportation through gates, &c., and in operating the machine near to a fence or other object near to the standing grain, and in other minor points.

That others may fully understand my invention, I will particularly describe it, having reference to the acccompanying drawings, wherein—

Figure 1 is a perspective view of my improvement. Figs. 2, 3, 4, and 5 are details.

The shaft 1 is supported at the ends of the arms or braces A, and its rear end is formed into or provided with a crank, 2, and is controlled by a hand-rod, 3, one end of which engages said crank, and the other end, passing through a guide-loop, 4, terminates with a hand-hold at a point easily within reach of the driver while on his seat. By means of this rod the driver may move the sheaf-gatherer at will, to discharge the bundles or to permanently set it back out of action, or to throw it over back above the binder out of the way while passing near the fence, &c.

The general features of the sheaf-gatherer alluded to above, excepting the reversed position of the same, are similar to those described in my other specification, also referred to, and therefore do not form part of the improvement covered herein.

The shaft 1 is made from iron with an angular cross-section, and preferably square, though it is evident the ends sought might be accomplished by making said shaft angular only at the points where the teeth 5 are attached to it; but this would be manifestly a colorable variation, and would necessarily involve extra cost for labor or extra weight of metal, and without any advantage as to results. The bearings of said shaft in the brace A are made with flanged cylindrical thimbles or sleeves 6, with axial opening fitted to the angular form of the shaft, so as to slip readily on the same, but not to turn thereon, and said sleeves turn in seats cut in the arms A, and are held in place by clips 7, whereof the tang or screw end passes through the brace and is secured by a nut.

The attachment of each tooth 5 to the angular shaft 1 is effected by means of the plate or clip 9, which has a transverse angular depression or seat fitted to the surface of the shaft, and at each side thereof openings for the passage of the tooth 5, the extremity of which is bent at right angles, and provided with a screw-nut, as shown at 8, so that when the parts are in place and said nut is tightened up the shaft is clamped between the tooth and clip, and the parts are held in position with the utmost firmness, and without any liability to shear off.

At the bend of the teeth, midway of their length, they are tied together by a strap-brace, 10, consisting of a strip of iron, which may be bent upon itself at its middle, so as to inclose the teeth between its two parts which are riveted together at each side of each tooth, and thereby holds them with great firmness, as shown in Fig. 4 or said tie may consist of a single bar attached to the teeth 5 by hook-bolts, as shown in Fig. 1.

The movement in one direction of the shaft 1 and attached teeth is limited by the spring-support 11, one end of which is fixed to the frame and the other end projects beyond the shaft 1 upon which it rests. The crank 2 drops into the loop or bend 12 of said spring, and is thereby supported in position to receive the bundles as they are ejected from the binder. The crank 2 and the spring-support 11 are so constructed and organized that the crank may move over inward and pass down by the side of the fixed end of the supporter 11, so as to permit the teeth 5 to lay back over the binder, as shown in dotted lines, and the gatherer may be caused to assume this or any other desired position by the attendant at will without leaving his seat.

Having described my invention, I claim as new—

1. The shaft 1, having an angular cross-section, and the tooth 5, provided with a screw-nut at one end, combined with the clip 9, having an angular seat fitted to the angular surface of the shaft and provided with openings for the passage of the tooth, whereby, when applied to the shaft, clip 9 occupies one side and the tooth passes on the other side, and the screw-nut firmly clamps the angular shaft between the clip and tooth.

2. A bundle-carrier provided with curved depending teeth 5 and with a horizontal shaft, 1, resting in boxes supported above the operative parts of the machine and provided with a crank, 2, and hand-rod 3, arranged to permit the carrier to be turned over on its back on top of the binder, as and for the purpose set forth.

WILLIAM N. WHITELEY.

Witnesses:
F. B. FURNISS,
L. PHILLIPS.